US005727907A

United States Patent [19]
Silva et al.

[11] Patent Number: 5,727,907
[45] Date of Patent: Mar. 17, 1998

[54] METHOD FOR THE REPARATION OF SUBMERGED PIPELINES

[76] Inventors: Jose de J. Silva; José A. Cajiga; Vicente R. Pérez, all of Bosque de Ciruelos #160, Office 803, Bosques de las Lomas #11700 Mexico City, D.F., Mexico

[21] Appl. No.: 555,105

[22] Filed: Nov. 8, 1995

[51] Int. Cl.⁶ .................................................. B63C 11/40
[52] U.S. Cl. ........................... 405/188; 405/158; 405/170
[58] Field of Search ............................ 405/158, 188–193, 405/159, 169–171

[56] References Cited

U.S. PATENT DOCUMENTS

| | | | |
|---|---|---|---|
| 2,667,751 | 2/1954 | Osborn | 405/188 |
| 3,321,924 | 5/1967 | Liddel | |
| 3,353,364 | 11/1967 | Blanding et al. | |
| 3,466,880 | 9/1969 | Elliott | 405/12 X |
| 3,473,338 | 10/1969 | Pearce | 405/188 |
| 3,508,410 | 4/1970 | Lynch | 405/188 X |
| 3,641,777 | 2/1972 | Banjavich et al. | |
| 3,785,160 | 1/1974 | Banjavich et al. | |
| 3,837,171 | 9/1974 | Scurlock | |
| 3,991,583 | 11/1976 | Scurlock | |
| 4,258,794 | 3/1981 | Sizer et al. | 166/356 |
| 4,345,854 | 8/1982 | Valantin | 405/159 |
| 4,443,129 | 4/1984 | de Sivry et al. | 405/170 |
| 4,720,213 | 1/1988 | Gernhardt et al. | 405/190 |
| 4,867,608 | 9/1989 | Kinghorn | 405/188 |
| 4,892,410 | 1/1990 | Snow et al. | 366/2 |
| 4,993,876 | 2/1991 | Snow et al. | 405/216 |
| 5,079,824 | 1/1992 | Lopez et al. | 29/402.13 |
| 5,087,154 | 2/1992 | Crawford | 405/216 |
| 5,324,140 | 6/1994 | Lopez et al. | 405/188 |
| 5,345,972 | 9/1994 | Goglio et al. | 138/99 |
| 5,380,131 | 1/1995 | Crawford | 405/216 |
| 5,400,735 | 3/1995 | Yamin et al. | 114/314 |
| 5,443,096 | 8/1995 | King | 138/99 |
| 5,507,596 | 4/1996 | Bostelman et al. | 405/191 |

FOREIGN PATENT DOCUMENTS 2100608  7/1993  Canada.

OTHER PUBLICATIONS

U.S. Design Patent Application No. 29/026,483, by Jose de J. Silva et al.

*Primary Examiner*—Dennis L. Taylor
*Attorney, Agent, or Firm*—Baker & Botts, L.L.P.

[57] ABSTRACT

A method for the reparation of a submerged pipeline for faults includes installing a habitat system proximate the reparation zone, clearing the pipeline in the fault zone, aligning a plurality of sets of half pipes with the reparation zone for installation surrounding the reparation zone, welding the two longitudinal ends of the first half pipe of each of the plurality of sets of half pipes to the two longitudinal ends of the second half pipe of each of the plurality of sets of half pipes to form a plurality of sleeves, welding the two reparation sleeve ends to the pipeline to join the reparation sleeve to the pipeline to form an annular space between the pipeline and the reparation sleeve, and injecting resin into the annular space.

2 Claims, 2 Drawing Sheets

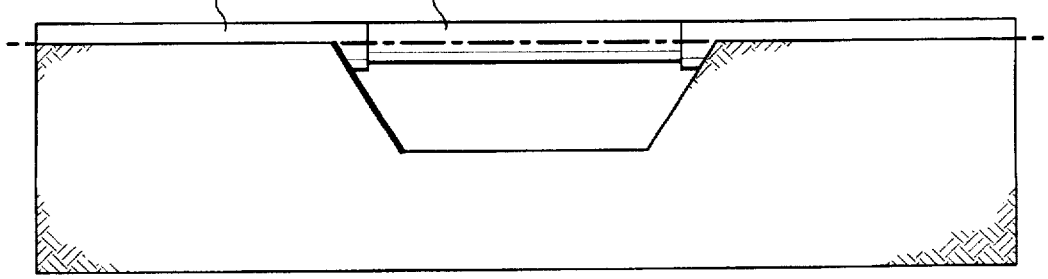
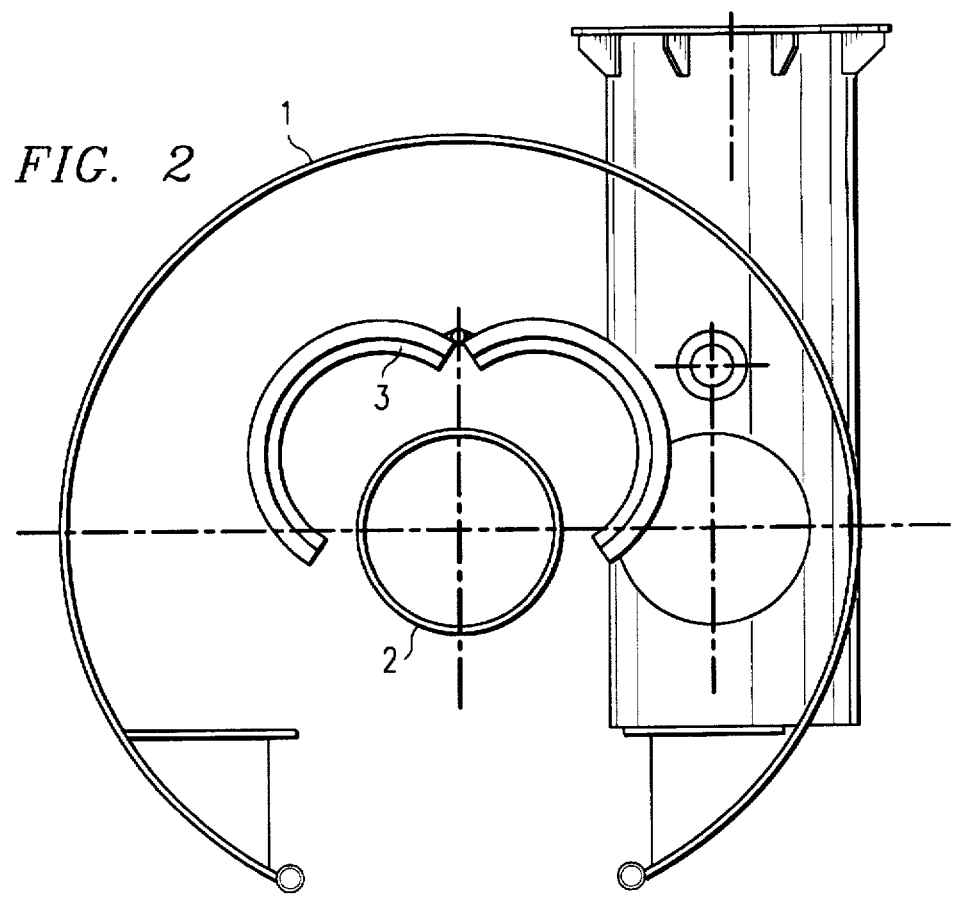
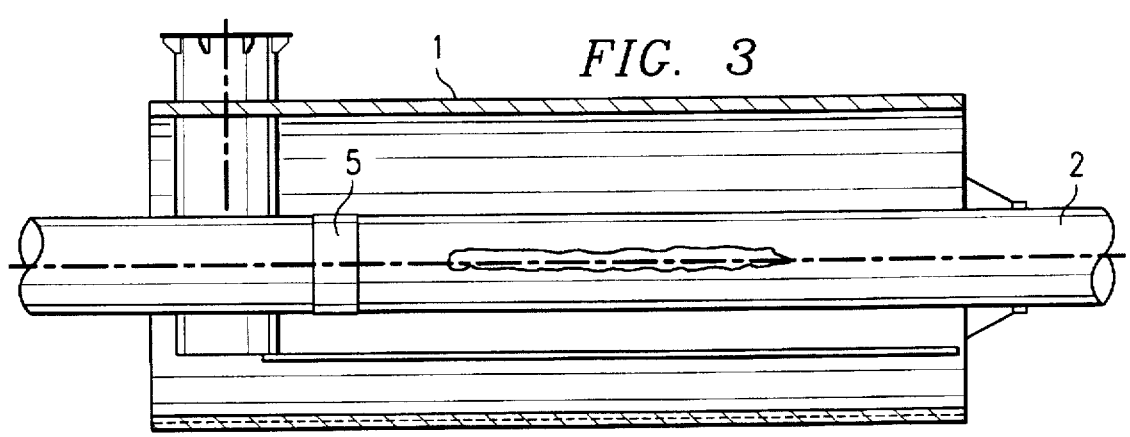

METHOD FOR THE REPARATION OF SUBMERGED PIPELINES

SUMMARY DESCRIPTION OF THE INVENTION

The objective of the invention is to have a reparations procedure (of a permanent type) for submerged underwater pipelines, be this in lacustrine zones or on the sea bed, with great advantages over the existing reparations systems.

The invention consists of a procedure for the reparation of pipelines of any diameter and thickness, with the object of strengthening it. This is achieved by means of this procedure, through the installation of a metal sleeve of any length, characterized by the injection of resin in the annular space between the pipeline and the sleeve and a special modular habitat equipment which is required for the application or installation of these sleeves on the submerged pipelines, principally situated on the sea bed or in lacustrine zones.

FIELD OF THE INVENTION

The invention belongs to the field of conduct pipeline reparation, principally the submerged type located on the sea bed or in lacustrine zones, whose walls have suffered damage as a result of corrosion caused by the environment, erosion, mechanical damage, or laminations in their base material; said conduct pipelines are principally employed in the oil and petrochemical industries, in which there exists the need to carry out this type of reparation.

The invention in its two different forms refers to the procedure for the application of a system of sleeves for the reparation of submerged pipelines, be this for a) faults that require one single installation of the habitat or b) faults which require reparations along a length of pipeline through several installations of the habitat.

BACKGROUND

It is known in the art by the experts on the matter as the reparation of submerged pipelines or conduction ducts, through the substitution of the damaged section, principally due to the location of these pipelines and the hostile environment which prevents easy access to the reparation site, due to the fact that these are normally situated on the sea bed or in lacustrine zones, the methods used up until now are the substitution of the length of pipeline, be it by carrying the pipe and removing it from the water to be able to cut the damaged section and later installing a new section, or depositing a new section of pipeline on the sea bed and substituting the damaged length by means of hyperbaric welding, or with the use of mechanic couples that allow the assembly of the new section and the existing piping.

BRIEF DESCRIPTION OF THE DRAWINGS

FIG. 1 is an elevation view of a pipeline for repair according to the teachings of the invention;

FIG. 2 is an end view of a habitat and a sleeve used to repair the pipeline illustrated in FIG. 1 according to the invention;

FIG. 3 is an elevation view of the habitat and pipeline shown in FIG. 1 before repair of the pipeline, showing additional features used in the method of the invention;

DISADVANTAGES OF THESE SYSTEMS

Figure 4:
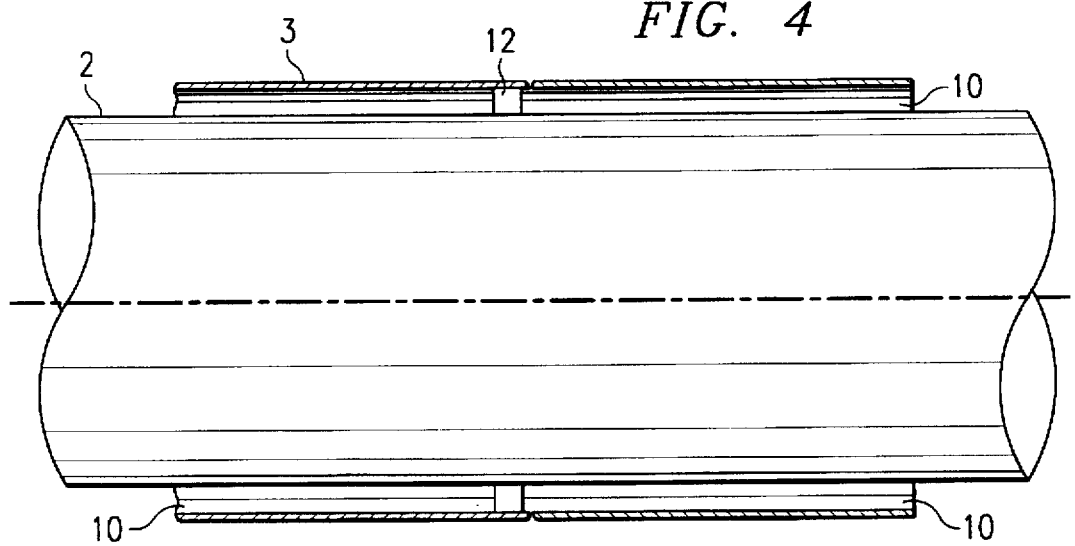
FIG. 4 is an elevation view of the pipeline shown in FIG. 1, showing additional details of the sleeve illustrated in FIG. 2 and also showing the injection of resin between the sleeve and the pipeline.

The main disadvantages of these systems is that the operation of the duct has to be halted in order to carry out the reparation, and as well as this, the mechanic couple systems have been failed to guarantee the reparation in the long term as leaks appear with the passing of time.

In the case of carrying the pipe in order to remove it from the hostile environment (water) and to be able to carry out the reparation, this procedure is limited as it depends on the depth where the pipeline is located and the diameter of the same, this reparation methodology being restricted to pipes of a small diameter, due to the fact that the removal of larger diameter pipes is virtually impossible and economically not feasible.

GENERAL DESCRIPTION OF THE INVENTION

The invention is described as a procedure for the reparation of submerged pipelines principally located on the sea bed, or in lacustrine zones, which requires special modular habitat equipment, not claimed in this application, for the execution of the underwater works in a dry and controlled environment, that allows the inspection of the damaged section of the pipeline. This procedure allows the installation of sleeves on any length on the pipeline.

In the lacustrine zones the habitat equipment normally allows direct access from the surface to the inner part of the habitat for the personnel who are going to carry out the work; in the case of the pipelines located on the sea bed, where the water is more than 10 meters deep, it is necessary to access the modular habitat equipment (patent pending) by means of diving or a hyperbaric bell which is coupled to the cabin.

The reparation procedure consists of; FIG. 1 location of the fault in the pipeline, once the fault is located proceed to prepare the working area by means of the dredging of the zone surrounding the section of piping (2) that is going to be repaired, the river clamp (4) on the piping is removed. The modular habitat equipment is positioned on the surface above the fault to be repaired, this being commonly transported on a jackup or in a boat. FIG. 2 the modular habitat (1) is installed above the zone of the pipeline (2) which is going to be repaired, the sections of sleeves (3) to be installed are hung in the upper part of the inside the habitat, the interior of the habitat possesses illumination systems, handling equipment (traveling crane), welding equipment and hand tools, etc. FIG. 3.

Figure 5:
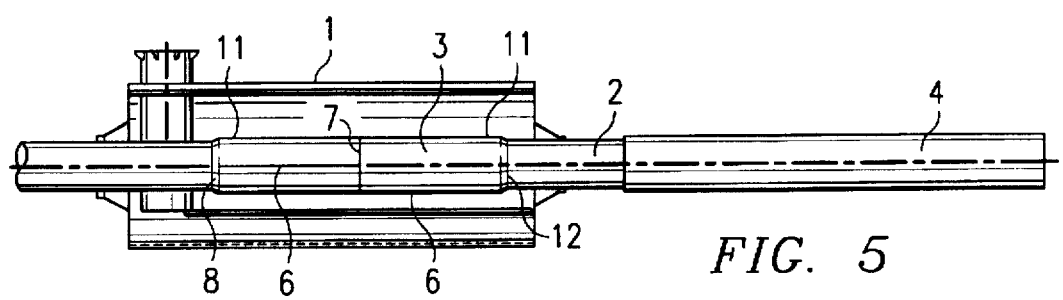
FIG. 5 is an elevation view of the pipeline show in FIG. 1 after a portion of the repair according to the invention has been completed.

Once the habitat (1) is in place, the pipeline (in the zone to be repaired) is cleaned preferably to bare metal, and the repair zone is inspected by means of non-destructive testing to identify the type and extension of the faults and to be able to determine the borders (5) at both ends of the reparation, at this end the welding of the sleeve (3) is going to be performed to join it to the pipeline (2) and therefore it is necessary to carry out the clockwise calibration of the thicknesses of the pipeline in this zone to guarantee security when applying the joining weld (8) to the duct sleeve. FIG. 5.

Once the inspection has been performed, the sleeve (3) is installed on the pipeline (2) and the bevels are adjusted, (depending on the length of the fault, the sleeve (3) can be made up of one or more sections of sleeve). Once the adjustment of the bevels has been checked, the lengthwise welds (6) are made joining the sleeve (3) to the piping in one of "N" number of sections of which this consists. Afterwards if the sleeve (3) is formed by several sections the circumference joining weld is made (7) between the sections that make up the sleeve (3). At the other end of the sleeve, a spacer (12) is installed, preferably manufactured from resin (10), between the sleeve (3) and the pipeline (2), and the sleeve (3) is then welded joining it to the pipe (2). After this the resin (10) is injected in the annular space be means of penetrators (11), which are located on the upper part of the end sections of the sleeve (3). FIG. 4.

Figure 6:
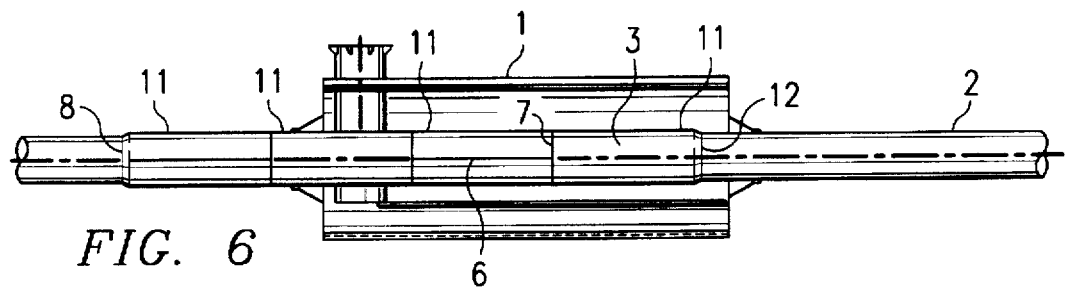
FIG. 6 illustrates the joining of multiple sections of sleeve for repair of the pipeline illustrated in FIG. 1.
Figure 7:
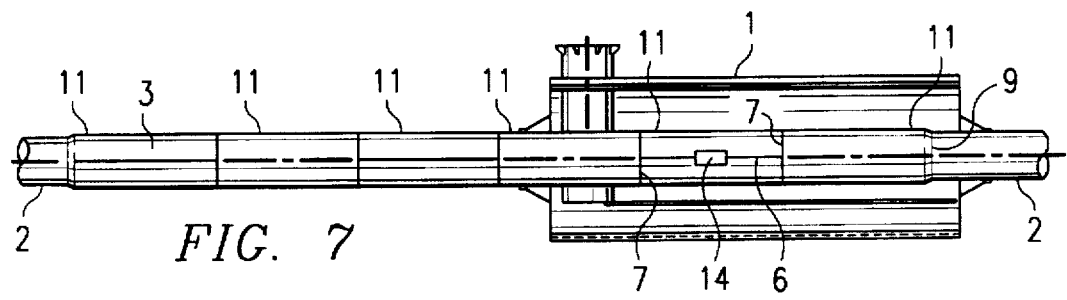
FIG. 7 illustrates the joining of multiple sections of sleeve for repair of the pipeline illustrated in FIG. 1.

This spacer allows the installation of a sleeve of any length, as it has two main functions, the first function is to work as a seal between the sleeve and the pipeline for the injection of the resin (10). The second function is to center the sleeve (3) on the pipe (2) and to allow the joining more sections of sleeve by moving the modular habitat (1) to a second (FIG. 6) or third (FIG. 7) position. This procedure is repeated "N" times using the spacers (12) at one end every time that the habitat needs to change position, until a sleeve of the desired length has been assembled. Once the sleeve has been assembled along the desired length of the pipeline, the sleeve (3) is welded (9) joining it to the pipeline (2). Once the sleeve has been welded to the pipe, the resin (10) is injected in the annular space by means of the penetrators (11), which are located on the upper part of the end sections of the sleeve (3). The anodes (14) are installed to cathodically protect the sleeve (3) and finally the specified exterior coating is applied to the sleeve (3) in the repair zone of the pipeline (2) and then the habitat equipment (1) is removed and the sea bed is cleaned.

Having described the invention, this is considered as being new and that contained in the following clauses is claimed as property:

1. A method for the reparation of a submerged pipeline for faults, the pipeline comprising metal and having a coating, the method comprising the steps of:

locating a reparation zone on the submerged pipeline to be repaired;

measuring the reparation zone;

dredging and cleaning a working zone proximate to the reparation zone;

cutting and removing of the pipeline coating in the reparation zone;

installing a habitat system proximate the reparation zone for storing equipment used in the reparation of the submerged pipeline;

cleaning the pipeline in the reparation zone down to the metal of the pipeline;

inspecting the pipeline in the reparation zone through non-destructive techniques;

calibrating the thickness of the pipeline in the reparation zone;

aligning a plurality of sets of half pipes with the reparation zone for installation surrounding the reparation zone of the submerged pipeline, each set of half pipes comprising a first half pipe and a second half pipe, the first half pipe and the second half pipe each having two longitudinal ends along the length of each half pipe, the step of aligning the plurality of sets of half pipes further comprising aligning the two longitudinal ends of the first half pipe of each set with the two longitudinal ends of the second half pipe of each set;

welding the two longitudinal ends of the first half pipe of each of the plurality of sets of half pipes to the two longitudinal ends of the second half pipe of each of the plurality of sets of half pipes to form a plurality of sleeves having a plurality of lengthwise welds;

inspecting the plurality of lengthwise welds through non-destructive techniques;

aligning longitudinally the plurality of sleeves;

circumferentially welding each of the plurality of sleeves to adjacent sleeves to form a plurality of circumferential welds and to form a reparation sleeve having two reparation sleeve ends;

inspecting the circumferential welds through non-destructive techniques;

aligning the two reparation sleeve ends with the pipeline;

welding the two reparation sleeve ends to the pipeline to join the reparation sleeve to the pipeline and to form an annular space between the pipeline and the reparation sleeve;

inspecting the welding of the reparation sleeve to the pipeline through non-destructive techniques;

pressure testing with nitrogen the annular space between the pipeline and the reparation sleeve;

injecting resin into the annular space;

applying an exterior coating to the pipeline;

recovering any equipment used in the reparation of the submerged pipeline; and inspecting and cleaning the working zone.

2. A method for the reparation of a submerged pipeline for faults, the pipeline comprising metal and having a coating, the method utilizing a movable habitat, the method comprising the steps of:

locating a first reparation zone on the submerged pipeline to be repaired;

measuring the first reparation zone;

dredging and cleaning a working zone proximate to the first reparation zone;

cutting and removing of the pipeline coating in the first reparation zone;

installing the habitat system proximate the first reparation zone for storing equipment used in reparation of the submerged pipeline;

cleaning the pipeline in the first reparation zone down to the metal of the pipeline;

inspecting the pipeline in the first reparation zone through non-destructive techniques;

calibrating the thickness of the pipeline in the first reparation zone;

aligning a first plurality of sets of half pipes with the first reparation zone for installation surrounding the first reparation zone of the submerged pipeline, each set of half pipes comprising a first half pipe and a second half pipe, the first half pipe and the second half pipe each having two longitudinal ends along the length of each half pipe, the step of aligning further comprising aligning the two longitudinal ends of the first half pipe of each of the first plurality of sets with the two longitudinal ends of the second half pipe of each of the first plurality of sets;

welding the two longitudinal ends of the first half pipe of each of the first plurality of sets of half pipes to the two longitudinal ends of the second half pipe of each of the first plurality of sets of half pipes to form a first plurality of sleeves having a first plurality of lengthwise welds;

inspecting the first plurality of lengthwise welds through non-destructive techniques;

aligning longitudinally the first plurality of sleeves;

circumferentially welding each of the first plurality of sleeves to adjacent sleeves to form a first plurality of circumferential welds and to form a first reparation sleeve having first and second ends;

inspecting the first plurality of circumferential welds through non-destructive techniques;

aligning the first end of the first reparation sleeve with the pipeline;

aligning the second end of the first reparation sleeve with the pipeline by installing spacers between the first reparation sleeve and the pipeline the spacers comprising resin;

welding the first reparation sleeve to the pipeline at the first end of the first reparation sleeve to join the first reparation sleeve to the pipeline and to form a first annular space between the pipeline and the first reparation sleeve;

inspecting the welding of the first and second ends of the first reparation sleeve to the pipeline through non-destructive techniques;

relocating the habitat to a second reparation zone;

measuring the second reparation zone;

inspecting the pipeline in the second reparation zone through non-destructive techniques;

calibrating the thickness of the pipeline in the second reparation zone;

aligning a second plurality of sets of half pipes with the second reparation zone for installation surrounding the second reparation zone of the submerged pipeline, each of the second plurality of sets of half pipes comprising a third half pipe and a fourth half pipe, the third half pipe and the fourth half pipe each having two longitudinal ends along the length of each half pipe, the step of aligning further comprising aligning the two longitudinal ends of the third half pipe of each of the second plurality of sets with the two longitudinal ends of the fourth half pipe of each of the second plurality of sets;

welding the two longitudinal ends of the third half pipe of each of the second plurality of sets of half pipes to the two longitudinal ends of the fourth half pipe of each of the second plurality of sets of half pipes to form a second plurality of sleeves having a second plurality of lengthwise welds;

inspecting the second plurality of lengthwise welds through non-destructive techniques;

aligning longitudinally the second plurality of sleeves;

circumferentially welding each of the second plurality of sleeves to adjacent sleeves to form a second plurality of circumferential welds and to form a second reparation sleeve having first and second ends;

aligning the first end of the second reparation sleeve with the second end of the first reparation sleeve;

circumstantially welding the first end of the second reparation sleeve to the second end of the first reparation sleeve;

aligning the second end of the second reparation sleeve with the pipeline;

welding the second reparation sleeve to the pipeline at the second end of the second reparation sleeve to join the second reparation sleeve to the pipeline and to form a second annular space between the pipeline and the second reparation sleeve;

inspecting the welding of the second reparation sleeve to the pipeline and the welding of the first reparation sleeve to the second reparation sleeve through non-destructive techniques;

pressure testing with nitrogen the first and second annular spaces;

injecting resin into the first and second annular spaces;

recovering any equipment used in the reparation of the submerged pipeline; and inspecting and cleaning the working zone.

\* \* \* \* \*